US010955844B2

(12) United States Patent
Yamamuro et al.

(10) Patent No.: US 10,955,844 B2
(45) Date of Patent: Mar. 23, 2021

(54) SERVER APPARATUS FOR ATTENUATING VIBRATION OF THE VEHICLE

(71) Applicants: Toyota Jidosha Kabushiki Kaisha, Toyota (JP); Denso Corporation, Kariya (JP)

(72) Inventors: Naoki Yamamuro, Nagoya (JP); Shinichi Adachi, Kariya (JP); Ryo Hattori, Kariya (JP); Taichi Amakasu, Toyota (JP); Keigo Hiruma, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 218 days.

(21) Appl. No.: 16/275,529

(22) Filed: Feb. 14, 2019

(65) Prior Publication Data
US 2019/0250612 A1    Aug. 15, 2019

(30) Foreign Application Priority Data
Feb. 15, 2018 (JP) ................................. 2018-024841

(51) Int. Cl.
*G05D 1/00* (2006.01)
*G05D 1/02* (2020.01)
*B60W 50/00* (2006.01)

(52) U.S. Cl.
CPC ....... *G05D 1/0088* (2013.01); *B60W 50/0098* (2013.01); *G05D 1/021* (2013.01);
(Continued)

(58) Field of Classification Search
CPC ........ G05D 1/0088; B60W 2050/0077; B60W 2710/226
See application file for complete search history.

(56) References Cited

U.S. PATENT DOCUMENTS

2010/0253018 A1  10/2010  Peterson
2014/0046558 A1*  2/2014  Kim .................. B60L 15/20
                                                     701/54
(Continued)

FOREIGN PATENT DOCUMENTS

JP       200918641 A  *  1/2009  ................ B61F 5/24
JP       2010241422 A     10/2010

*Primary Examiner* — Thomas G Black
*Assistant Examiner* — Tarek Elarabi
(74) *Attorney, Agent, or Firm* — Dinsmore & Shohl LLP

(57) ABSTRACT

A server apparatus capable of communicating with a plurality of vehicles each of which carries a vibration control apparatus for attenuating vibration by adjusting a parameter that affects a predetermined acceleration so that the predetermined acceleration approaches a target acceleration is disclosed. The server apparatus acquires traveling data including a magnitude of the predetermined acceleration generated in each of the vehicles and the target acceleration set for the vehicle every time when each of the vehicles travels on each of sections of a previously divided road, and accumulates the acquired traveling data while being correlated with section identification information. Then, the server apparatus sets the target acceleration which is adequate for each of the vehicles to travel on a scheduled traveling section on the basis of the accumulated traveling data, and transmits the set target acceleration to the vehicle scheduled to travel on the scheduled traveling section.

4 Claims, 7 Drawing Sheets

(52) U.S. Cl.
CPC . *B60W 2050/0077* (2013.01); *B60W 2554/00* (2020.02); *B60W 2555/20* (2020.02); *B60W 2710/226* (2013.01); *G05D 2201/0213* (2013.01)

(56) References Cited

U.S. PATENT DOCUMENTS

2019/0193721 A1\* 6/2019 Yamamuro ......... B60W 30/182
2019/0193722 A1\* 6/2019 Yamamuro ............ B60G 17/08

\* cited by examiner

[Fig. 1]
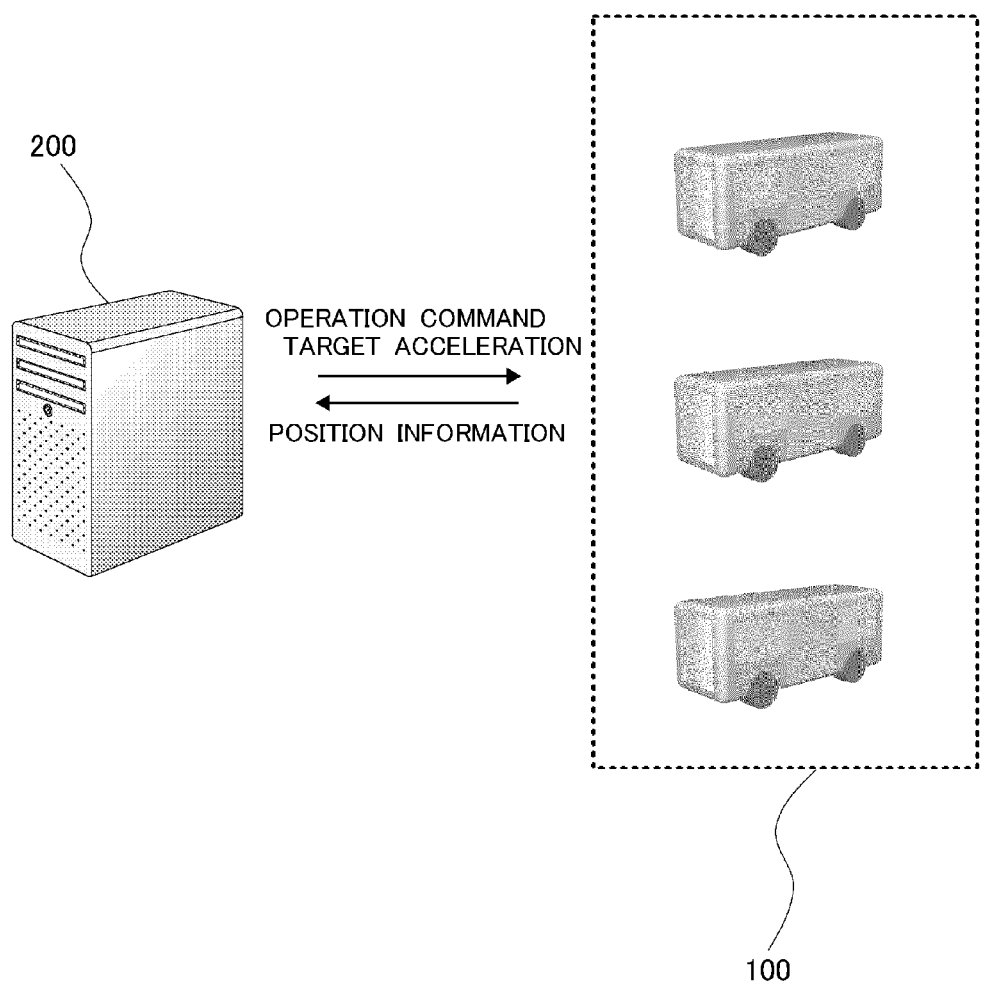

[Fig. 2]
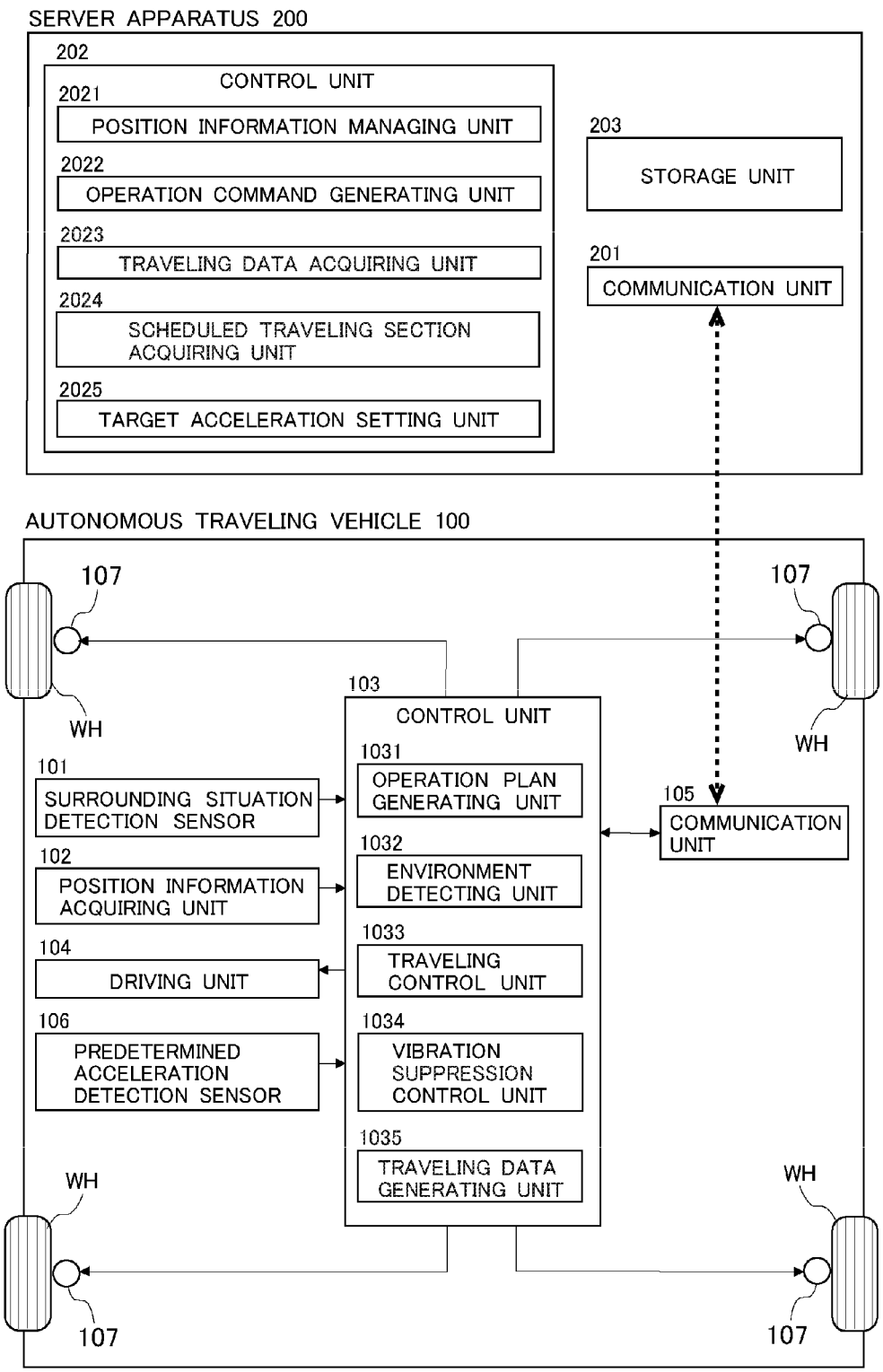

[Fig. 3]

| VEHICLE ID | POSITION INFORMATION | RECEIVING DATE AND TIME | SPECIFICATIONS OF VEHICLE |
|---|---|---|---|
| S001 | --- | 2017/12/12/10:00 | xxxx |
| S002 | --- | 2017/12/12/09:55 | xxxx |
| S003 | --- | 2017/12/12/10:05 | xxxx |
| S004 | --- | 2017/12/12/09:50 | xxxx |

[Fig. 4]

| SECTION ID | PREDETERMINED ACCELERATION | TARGET ACCELERATION | SPECIFICATIONS OF VEHICLE |
|---|---|---|---|
| SEC00001 | △△△△ | ○○○○ | ××××  |
|  | △△△△ | ○○○○ | ×××× |
|  | △△△△ | ○○○○ | ×××× |
| SEC00002 | △△△△ | ○○○○ | ×××× |
|  | △△△△ | ○○○○ | ×××× |
|  | △△△△ | ○○○○ | ×××× |
| ⋮ | ⋮ | ⋮ | ⋮ |

[Fig. 5]
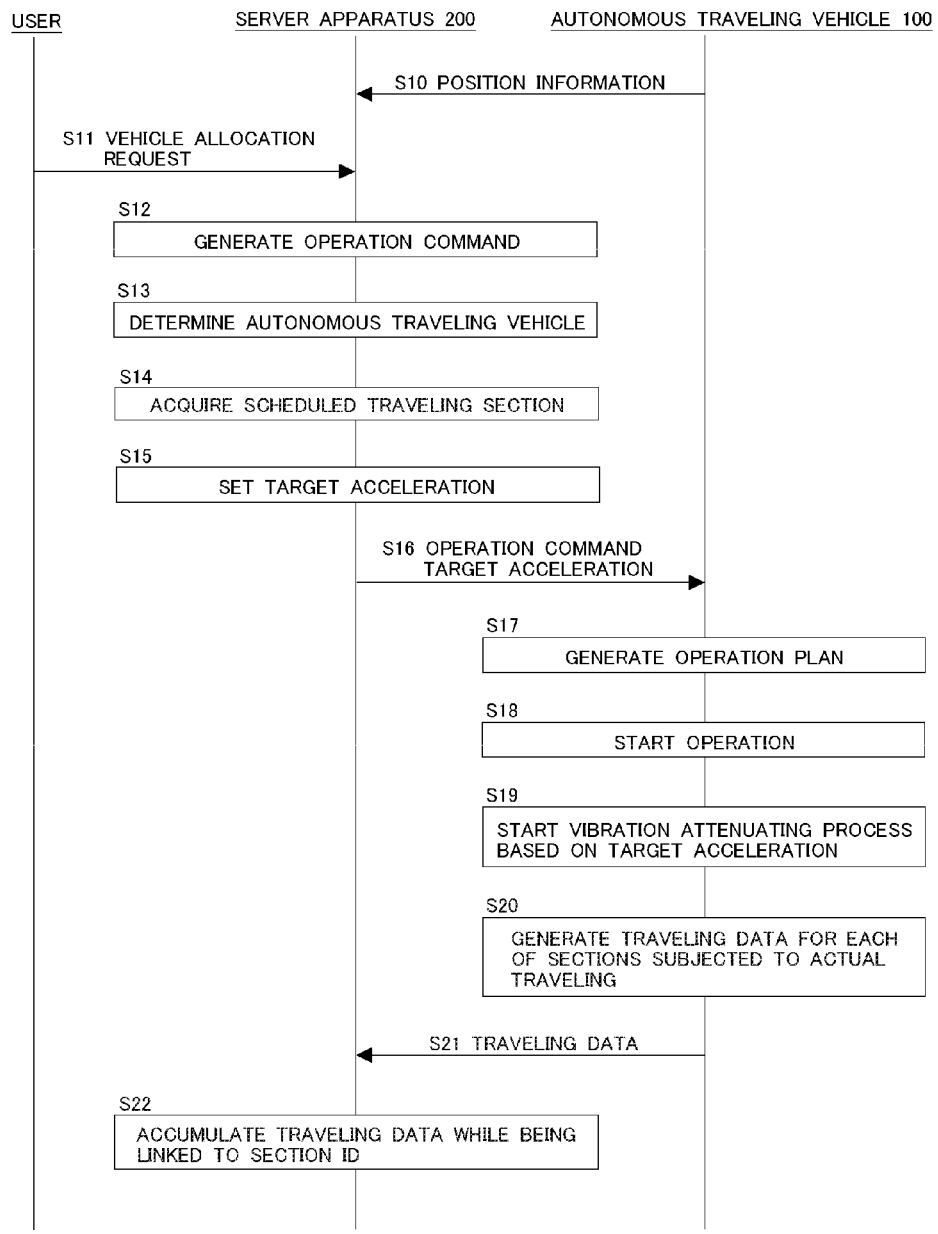

[Fig. 6]
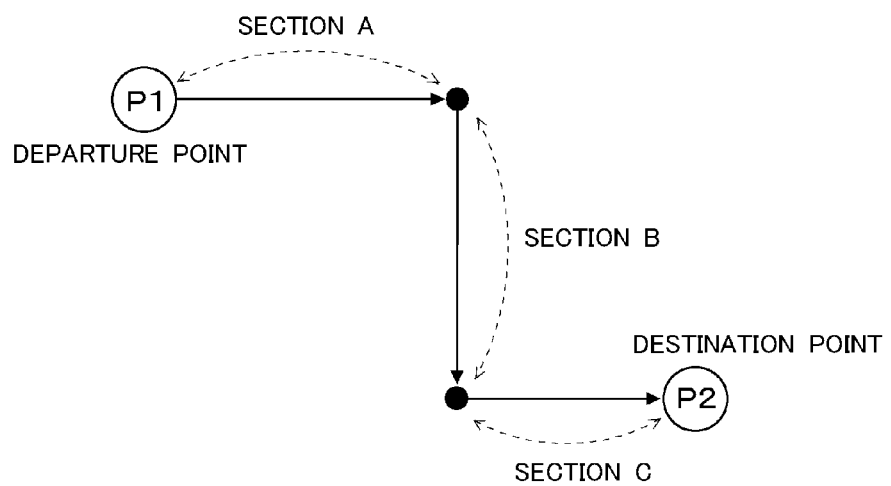

[Fig. 7]

| SECTION ID | PREDETERMINED ACCELERATION | TARGET ACCELERATION | SPECIFICATIONS OF VEHICLE | TRAVELING ENVIRONMENT |
|---|---|---|---|---|
| SEC00001 | △△△△ | ○○○○ | ×××× | ☐☐☐☐ |
| | △△△△ | ○○○○ | ×××× | ☐☐☐☐ |
| | △△△△ | ○○○○ | ×××× | ☐☐☐☐ |
| SEC00002 | △△△△ | ○○○○ | ×××× | ☐☐☐☐ |
| | △△△△ | ○○○○ | ×××× | ☐☐☐☐ |
| | △△△△ | ○○○○ | ×××× | ☐☐☐☐ |
| ⋮ | ⋮ | ⋮ | ⋮ | ⋮ |

SERVER APPARATUS FOR ATTENUATING VIBRATION OF THE VEHICLE

CROSS REFERENCE TO RELATED APPLICATION

This application claims the benefit of Japanese Patent Application No. 2018-024841, filed on Feb. 15, 2018, which is hereby incorporated by reference herein in its entirety.

BACKGROUND

Technical Field

The present disclosure relates to a server apparatus. In particular, the present disclosure relates to a server apparatus which manages data in order to attenuate the vibration of the vehicle.

Description of Related Art

In relation to the vehicle such as an automobile or the like for transporting people and articles, such a technique is known that the vibration of the vehicle is attenuated and thus the transport quality represented by the riding comfort is improved by adjusting the parameter which affects the predetermined acceleration including at least one of the acceleration in the upward-downward direction of the vehicle, the acceleration in the lateral direction of the vehicle, and the acceleration in the front-back direction of the vehicle, such as the damping force characteristic of a damper concerning a suspension, the roll stiffness of a stabilizer, the response characteristic of a steering, the rate of change of the vehicle speed or the like. For example, Japanese Patent Application Laid-Open No. 2010-241422 suggests an active type suspension system in which the vibration is attenuated by detecting any undesired vibration of a wheel and/or a vehicle body which may be generated by the variation of the spring stiffness of an air suspension, and adjusting the damping force characteristic of the air suspension depending on the detected vibration.

SUMMARY

In the meantime, according to the conventional technique described above, the damping characteristic or attenuation characteristic, which is determined for the vehicle, is reflected to only the subject vehicle. Therefore, if any other vehicle travels along the same or equivalent route as that of the subject vehicle, it is also necessary for the other vehicle to perform the detecting process for detecting the vibration and the adjusting process for adjusting the damping force characteristic. Further, the damping force characteristic, which is required for the vehicle, differs depending on the road surface shape (for example, the sizes of irregularities (protrusions and recesses) and the waviness) of the road on which the vehicle travels. Therefore, it is necessary to perform the detection of the vibration and the adjustment of the damping force characteristic every time when the road surface shape of the road changes. On account of these factors, there is a possibility that the calculation load, which is exerted on the individual vehicle, may be increased.

The present disclosure has been made taking the various actual circumstances as described above into consideration, an object of which is to provide a technique that makes it possible to realize the preferred vibration control performance for a plurality of vehicles without excessively increasing the calculation load exerted on the individual vehicle.

In the present disclosure, in order to solve the problem as described above, such a server apparatus is provided that the communication can be performed with a plurality of vehicles each of which carries a vibration control apparatus for attenuating the vibration by adjusting any parameter that affects a predetermined acceleration so that the predetermined acceleration approaches a target acceleration, wherein the traveling data, which includes the magnitude of the predetermined acceleration generated in each of the vehicles and the target acceleration set for the vehicle, is acquired every time when each of the vehicles travels on each of sections (segments or intervals) of a previously divided road, and the acquired traveling data is accumulated beforehand while being correlated with section identification information. Thus, the target acceleration, which is adequate for each of the vehicles to travel on a scheduled traveling section, is set on the basis of the accumulated traveling data, and the set target acceleration is transmitted to each of the vehicles.

In particular, the present disclosure resides in a server apparatus capable of communicating with a plurality of vehicles each of which carries a vibration control apparatus for attenuating vibration of the vehicle by adjusting a parameter that affects a predetermined acceleration so that the predetermined acceleration, which includes at least one of an acceleration in an upward-downward direction, an acceleration in a lateral direction, and an acceleration in a front-back direction, approaches a target acceleration. The server apparatus acquires traveling data including a magnitude of the predetermined acceleration generated in each of the vehicles and the target acceleration set for each of the vehicles every time when each of the vehicles, which carries the vibration control apparatus, travels on each of sections of a previously divided road, and the server apparatus accumulates the acquired traveling data while being correlated with section identification information as identification information of the section on which each of the vehicles travels. Further, the server apparatus acquires a scheduled traveling section of each of the vehicles, and the server apparatus sets the target acceleration which is adequate for each of the vehicles to travel on the scheduled traveling section on the basis of the traveling data accumulated while being correlated with the section identification information of the scheduled traveling section. Then, the server apparatus transmits the target acceleration to the vehicle scheduled to travel on the scheduled traveling section.

The target acceleration, which is required for the vehicle, differs depending on the road surface shape of the road on which the vehicle travels. For example, when the vehicle travels on the road having a bad road surface shape (for example, a road having relatively large irregularities (protrusions or recesses) and/or relatively large differences in height, and a road having relatively large waviness), it is necessary to raise the vibration control performance of the vehicle by setting the target acceleration to be relatively small, as compared with when the vehicle travels on the road having a good road surface shape (for example, a road having relatively small irregularities (protrusions or recesses) and/or relatively small differences in height, and a road having relatively small waviness). In the meantime, the road surface shape of the road is not uniform. There is a possibility that the road surface shape of the road may change on every section of the road. On this account, it is desirable that the target acceleration of the vehicle is changed depending on the road surface shape on each of the sections of the road on which the vehicle travels. However, if the process is performed on the side of the vehicle in order to set the target acceleration adequate for each of the sections of the road, there is a possibility that the calculation load exerted on the side of the vehicle may be increased. Further, if the target acceleration, which is set for each of the vehicles, is reflected to only the subject vehicle, the setting process for setting the target acceleration must be performed for any other vehicle when the other vehicle travels on the same section as the section on which the subject vehicle travels.

On the contrary, in the case of the server apparatus according to the present disclosure, the traveling data, which includes the magnitude of the predetermined acceleration generated in each of the vehicles and the target acceleration set for each of the vehicles, is acquired every time when the vehicle travels on each of the sections of the previously divided road, and the traveling data is accumulated while being correlated with the section identification information. Then, if the scheduled traveling section for each of the vehicles is acquired, the server apparatus sets the target acceleration which is adequate for each of the vehicles to travel on the scheduled traveling section on the basis of the traveling data accumulated while being correlated with the section identification information of the scheduled traveling section. The target acceleration, which is set as described above, is transmitted from the server apparatus to the vehicle which is scheduled to travel on the scheduled traveling section. Accordingly, when the vehicle travels on the scheduled traveling section, it is possible to adjust the parameter which affects the predetermined acceleration, on the basis of the target acceleration received from the server apparatus. Therefore, it is unnecessary to set the target acceleration adequate for each of the sections on the side of the vehicle. Further, it is also possible to reflect the target acceleration adequate for the traveling on each of the sections to the plurality of vehicles. As a result, it is possible to realize the preferred vibration control performance in the plurality of vehicles, without excessively increasing the calculation load exerted on the individual vehicle.

In this context, the target acceleration, which is required for the vehicle, may sometimes change depending on not only the road surface shape of the road on which the vehicle travels but also the traveling environment such as the weather, the traffic status and the like. For example, the coefficient of friction of the road surface easily decreases upon the rainfall, the snowfall or the like, as compared with upon the fine weather, the cloudy weather or the like. Therefore, it is desirable that the target acceleration is set while regarding the steering stability as important as compared with the vibration control performance. On the other hand, when the traffic status is bad upon the traffic congestion (traffic jam) or the like, the traveling speed of the vehicle is lowered, as compared with when the traffic status is good upon the smooth traffic flow or the like. Therefore, it is desirable that the target acceleration is set while regarding the vibration control performance as important as compared with the steering stability.

In view of the above, the server apparatus according to the present disclosure may acquire traveling environment information including at least one of weather information and traffic status provided when each of the vehicles travels on each of the sections, in addition to the traveling data including the magnitude of the predetermined acceleration generated in each of the vehicles and the target acceleration set for each of the vehicles, every time when the vehicle, which carries the vibration control apparatus, travels on each of the sections. In accordance therewith, the server apparatus may accumulate the traveling data and the traveling environment information while being correlated with the section identification information of the section on which each of the vehicles travels. Then, the server apparatus may extract the traveling data provided in a traveling environment approximate to a traveling environment provided when each of the vehicles travels on the scheduled traveling section, from the traveling data accumulated while being correlated with the section identification information of the scheduled traveling section so that the target acceleration, which is adequate for each of the vehicles to travel on the scheduled traveling section, may be set on the basis of the extracted traveling data.

According to the server apparatus configured as described above, it is possible to set the target acceleration in which not only the road surface shape of each of the sections but also the traveling environment of each of the sections is taken into consideration. Then, the target acceleration, which is set as described above, is reflected to the plurality of vehicles which travel on each of the sections. Therefore, it is possible to realize the more preferred vibration control performance without excessively increasing the calculation load exerted on the vehicle.

In this context, the server apparatus described above is preferred for the vehicle which carries an operation control apparatus for allowing a subject vehicle to perform autonomous traveling in accordance with a predetermined operation command. In this case, the server apparatus may generate the operation command adequate for the vehicle and transmit the generated operation command to the operation control apparatus of each of the vehicles.

According to the present disclosure, it is possible to realize the preferred vibration control performance for the plurality of vehicles without excessively increasing the calculation load exerted on the individual vehicle.

BRIEF DESCRIPTION OF DRAWINGS

FIG. 1 indicates an outline of a moving body system to which the present disclosure is applied.

FIG. 2 indicates a block diagram schematically illustrating exemplary constitutive components possessed by the moving body system.

FIG. 3 exemplifies the table configuration of the vehicle information stored in a storage unit of a server apparatus.

FIG. 4 exemplifies the table configuration of the traveling data information stored in the storage unit of the server apparatus.

FIG. 5 indicates a flow diagram illustrating the flow of the data and the process performed between the respective constitutive components of the moving body system according to the embodiment of the present disclosure.

FIG. 6 indicates an exemplary scheduled traveling route.

FIG. 7 exemplifies the table configuration of the traveling data information stored in the storage unit of the server apparatus in another embodiment.

DETAILED DESCRIPTION

An explanation will be made below on the basis of the drawings about specified embodiments of the present disclosure. For example, the dimension or size, the material, the shape, and the relative arrangement of constitutive parts or components described in the embodiments of the present disclosure are not intended to limit the technical scope of the present disclosure only thereto unless specifically noted.

<System Outline>

In this embodiment, an example will be described, in which the present disclosure is applied to a server apparatus capable of communicating with vehicles as moving bodies in a moving body system including a plurality of moving bodies capable of performing the autonomous traveling. FIG. 1 indicates an outline of a moving body system according to this embodiment. The moving body system indicated in FIG. 1 is configured to include a plurality of autonomous traveling vehicles 100 which perform the autonomous traveling in accordance with provided operation commands, and a server apparatus 200 which issues the operation commands to the respective autonomous traveling vehicles 100. The autonomous traveling vehicle 100 is an automatic driving vehicle which provides predetermined service. On the other hand, the server apparatus 200 is an apparatus which manages the plurality of autonomous traveling vehicles 100.

Each of the autonomous traveling vehicles 100 is a multipurpose moving body in which the specification such as the inner and outer package or the like can be easily changed depending on the use (way of use), the vehicle being capable of performing the autonomous traveling on the road. The autonomous traveling vehicle 100 is, for example, a pickup bus which picks up (welcomes and sends off) customers along with a predetermined route, an on-demand taxi which is operated along with a route corresponding to a request from a customer, a cargo transport vehicle which transports cargoes along with a predetermined route, or a staying type passenger transport vehicle which is operated along with a route corresponding to a request from a customer (for example, a vehicle which is installed with hotel facilities or workspace in the room). When the exclusive purpose of the way of use of the autonomous traveling vehicle 100 is to transport cargoes and passengers, it is possible to transport the cargoes and passengers while being operated along with a predetermined route. On the other hand, when the object (purpose) of the way of use of the autonomous traveling vehicle 100 is the staying and the transport of passengers, it is possible to transport the passengers while allowing the passengers to lodge or work in the room. Note that it is not necessarily indispensable that the autonomous traveling vehicle 100 of this embodiment should be a vehicle on which any person other than passengers does not get. For example, the customer service personnel to perform the customer service for passengers, the security personnel to secure the safety of the autonomous traveling vehicle 100, or the collection and delivery personnel to load and unload cargoes may be accompanied. Further, it is also allowable that the autonomous traveling vehicle 100 is not necessarily a vehicle which can perform the complete autonomous traveling. The autonomous traveling vehicle 100 may be a vehicle for which the driving personnel performs the driving or the assistance for the driving depending on circumstances.

Further, each of the autonomous traveling vehicles 100 also has the function such that the vibration of the autonomous traveling vehicle 100 is attenuated by adjusting the parameter which affects the predetermined acceleration so that the predetermined acceleration, which is generated during the traveling of the autonomous traveling vehicle 100, approaches the target acceleration. The "predetermined acceleration" referred to herein includes, for example, the acceleration in the upward-downward direction of the autonomous traveling vehicle 100, the acceleration in the lateral direction of the autonomous traveling vehicle 100, and the acceleration in the front-back direction of the autonomous traveling vehicle 100. That is, each of the autonomous traveling vehicles 100 adjusts the parameters described above so that the accelerations in the three directions described above approach the target accelerations corresponding thereto respectively. Further, the parameter, which affects the predetermined acceleration as described above, is, for example, the damping force characteristic (damping coefficient or attenuation coefficient) of a damper (shock absorber) attached to the suspension of the autonomous traveling vehicle 100, the spring constant of an air spring attached to the suspension of the autonomous traveling vehicle 100, the roll stiffness of a stabilizer provided to span the left and right wheels of the autonomous traveling vehicle 100, the response characteristic of a steering (for example, the rate of change of the turning velocity of the wheel WH), the vehicle velocity, or the rate of change of the vehicle velocity. Note that in this embodiment, a case will be described, in which the damping force characteristic (damping coefficient or attenuation coefficient) of the damper included in the parameters described above is adjusted.

The server apparatus 200 is an apparatus which commands the respective autonomous traveling vehicles 100 to perform the operation. For example, when the autonomous traveling vehicle 100 is an on-demand taxi, then a request from a user is accepted, and the point for the vehicle to go to pickup the user and the destination point are acquired. After that, an operation command of "transport the person from the departure point to the destination point" is transmitted to the autonomous traveling vehicle 100 having the equipment of the taxi, of the autonomous traveling vehicles traveling in the neighborhood. Accordingly, the autonomous traveling vehicle 100, which receives the operation command from the server apparatus 200, can travel along the route based on the operation command. Note that the operation command not necessarily commands the autonomous traveling vehicle 100 to perform the traveling to connect the departure point and the destination point. For example, the operation command may be "travel to predetermined point to collect and/or deliver cargo" or "stop for a predetermined time at a sightseeing spot existing in the course of predetermined route". In this way, the operation command may include the action other than the traveling to be performed by the autonomous traveling vehicle 100.

Further, the server apparatus 200 also has the function to set the target acceleration adequate for the traveling on each of the sections, for each of the sections of the road on which each of the autonomous traveling vehicles 100 travels. In relation thereto, the server apparatus 200 acquires the magnitude of the predetermined acceleration actually generated in each of the autonomous traveling vehicles 100 and the target acceleration set for the autonomous traveling vehicle 100 every time when each of the autonomous traveling vehicles 100 travels on each of the sections of the road, and the server apparatus 200 accumulates the acquired data (hereinafter referred to as "traveling data" in some cases) while being correlated to the section identification information for identifying each of the sections of the road. Then, the server apparatus 200 sets the target acceleration adequate for the traveling on each of the sections on the basis of the accumulated traveling data group of a large number of cases (big data), and the server apparatus 200 transmits the set target acceleration to the vehicle scheduled to travel on each of the sections. Accordingly, when each of the autonomous traveling vehicles 100 travels on the road, it is unnecessary to perform the setting process for setting the target acceleration on the side of the vehicle every time when the road surface shape or the like of the road changes. Therefore, it is possible to realize the preferred vibration control performance in the plurality of autonomous traveling vehicles 100 without excessively increasing the calculation load on the side of the vehicle.

<System Configuration>

Next, an explanation will be made in detail about the constitutive components of the movement system according to this embodiment. FIG. 2 indicates a block diagram schematically illustrating exemplary configuration of the autonomous traveling vehicle 100 and the server apparatus 200 indicated in FIG. 1. Note that a plurality of autonomous traveling vehicles 100 may be provided.

As described above, the autonomous traveling vehicle 100 is the vehicle which travels in accordance with the operation command acquired from the server apparatus 200. Further, the autonomous traveling vehicle 100 also has the function to adjust the damping force characteristic (damping coefficient or attenuation coefficient) during the traveling of the autonomous traveling vehicle 100 on the basis of the target acceleration acquired from the server apparatus 200. The autonomous traveling vehicle 100 as described above is configured to include, for example, a surrounding situation detection sensor 101, a position information acquiring unit 102, a control unit 103, a driving unit 104, a communication unit 105, a predetermined acceleration detection sensor 106, and damper actuators 107. Note that the autonomous traveling vehicle 100 of this embodiment is an electric automobile which is driven by using an electric motor as a motor. The motor of the autonomous traveling vehicle 100 is not limited to the electric motor, which may be an internal combustion engine or a hybrid mechanism composed of an internal combustion engine and an electric motor.

The surrounding situation detection sensor 101 senses around the vehicle. Typically, the surrounding situation detection sensor 101 is configured to include, for example, a stereo camera, a laser scanner, LIDAR, and a radar. The information, which is acquired by the surrounding situation detection sensor 101, is delivered to the control unit 103.

The position information acquiring unit 102 acquires the present position of the autonomous traveling vehicle 100. Typically, the position information acquiring unit 102 is configured to include, for example, a GPS receiver. Note that the position information acquiring unit 102 acquires the present position of the autonomous traveling vehicle 100 at a predetermined cycle and delivers the information concerning the acquired present position to the control unit 103. In accordance therewith, every time when the control unit 103 accepts the position information from the position information acquiring unit 102, the control unit 103 transmits the position information to the server apparatus 200. In other words, the position information of the autonomous traveling vehicle 100 is transmitted at a predetermined cycle from the autonomous traveling vehicle 100 to the server apparatus 200.

The predetermined acceleration detection sensor 106 is configured to include, for example, an upward-downward acceleration sensor for detecting the acceleration in the upward-downward direction of the autonomous traveling vehicle 100, a lateral acceleration sensor for detecting the acceleration in the lateral direction of the autonomous traveling vehicle 100, and a front-back acceleration sensor for detecting the acceleration in the front-back direction of the autonomous traveling vehicle 100. In this arrangement, the upward-downward acceleration sensor is, for example, a sprung acceleration sensor (spring acceleration sensor) which is attached to a sprung member (for example, a vehicle body) in the vicinity of a suspension of each of wheels WH, and/or an unsprung acceleration sensor (unspring acceleration sensor) which is attached to an unsprung member (for example, a lower arm) in the vicinity of the suspension of each of the wheels WH. The information, which is detected by the predetermined acceleration detection sensor 106, is delivered to the control unit 103.

The damper actuator 107 is the means for changing the damping force characteristic (damping coefficient or attenuation coefficient) of a damper (not indicated) attached to the suspension of each of the wheels WH. The damping force characteristic of the damper is changed continuously or in a stepwise manner by changing, for example, the cross-sectional area of the flow passage for the viscous fluid (for example, oil) formed in the damper. The damper actuator 107 is operated by the electric power supplied from an unillustrated battery carried on the autonomous traveling vehicle 100. Note that the method for changing the damping force characteristic of the damper is not limited thereto. It is also allowable to use any other known method.

The control unit 103 is a computer which controls the operation of the autonomous traveling vehicle 100 on the basis of the information acquired from the surrounding situation detection sensor 101 and which controls the damper actuator 107 on the basis of the information acquired from the predetermined acceleration detection sensor 106. The control unit 103 is configured, for example, by a microcomputer. The control unit 103 of this embodiment has, as functional modules, an operation plan generating unit 1031, an environment detecting unit 1032, a traveling control unit 1033, a vibration suppression control unit 1034, and a traveling data generating unit 1035. The respective functional modules may be realized by executing programs stored in the storage means such as ROM (Read Only Memory) or the like by CPU (Central Processing Unit) (any of them is not indicated).

The operation plan generating unit 1031 acquires the operation command from the server apparatus 200 to generate the operation plan of the subject vehicle. In this embodiment, the operation plan is the data that prescribes the route along which the autonomous traveling vehicle 100 travels and the process which is to be performed by the autonomous traveling vehicle 100 in a part of or all of the route. For example, the followings are exemplified as examples of the data included in the operation plan.

(1) Data in which Route (Scheduled Traveling Route) Scheduled for Subject Vehicle to Travel Therealong is Represented by Set of Road Links The "scheduled traveling route" referred to herein may be generated by the operation plan generating unit 1031, for example, on the basis of the departure point and the destination point given by the operation command sent from the server apparatus 200 while making reference to the map data stored in the storage apparatus carried on the autonomous traveling vehicle 100. Alternatively, the "scheduled traveling route" may be generated by utilizing any external service, or it may be provided from the server apparatus 200. Note that in the configuration in which the "scheduled traveling route" is generated by utilizing the external service or the operation plan generating unit 1031 of the autonomous traveling vehicle 100, it is assumed that the generated "scheduled traveling route" is transmitted to the server apparatus 200 by the communication unit 105 described later on.

(2) Data which Represents Process to be Performed by Subject Vehicle at Arbitrary Point on Scheduled Traveling Route The process to be performed by the subject vehicle includes, for example, "allow passengers to get on/off", "load/unload cargoes", and "stop for a predetermined period for passenger's sightseeing". However, there is no limitation thereto.

The environment detecting unit 1032 detects the environment around the vehicle on the basis of the data acquired by the surrounding situation detection sensor 101. The object of the detection is, for example, the number and the position of the lane(s), the number and the position of the vehicle(s) existing around the subject vehicle, the number and the position of the obstacle(s) (for example, pedestrian(s), bicycle(s), structure(s), and building(s)) existing around the subject vehicle, the structure of the road, and the road sign. However, there is no limitation thereto. The detection target may be anyone provided that the object is required to perform the autonomous traveling. Further, the environment detecting unit 1032 may perform the tracking for the detected object. For example, the relative velocity of the object may be determined from the difference between the coordinates of the object detected one step before and the present coordinates of the object.

The traveling control unit 1033 controls the traveling of the subject vehicle on the basis of the operation plan generated by the operation plan generating unit 1031, the environment data generated by the environment detecting unit 1032, and the position information of the subject vehicle acquired by the position information acquiring unit 102. For example, the traveling control unit 1033 allows the subject vehicle to travel along the scheduled traveling route generated by the operation plan generating unit 1031, and the traveling control unit 1033 allows the subject vehicle to travel so that any obstacle does not enter a predetermined safe area provided around the subject vehicle as the center. Note that as for the method for allowing the subject vehicle to perform the autonomous traveling, it is possible to adopt any known method.

The vibration suppression control unit 1034 specifies the section of the road on which the subject vehicle travels, on the basis of the present position (current position) of the subject vehicle acquired by the position information acquiring unit 102. Then, the vibration suppression control unit 1034 controls the damper actuator 107 of each of the wheels WH so that the predetermined acceleration, which is generated when the subject vehicle travels on the specified section, approaches the target acceleration set by the server apparatus 200 (vibration attenuating process). In the vibration attenuating process, for example, if at least one of the sprung accelerations of the plurality of wheels WH, at least one of the unsprung accelerations of the plurality of wheels WH, the lateral acceleration of the autonomous traveling vehicle 100, or the front-back acceleration of the autonomous traveling vehicle 100 exceeds a predetermined threshold value, then the vibration suppression control unit 1034 individually calculates the damping force characteristic (damping coefficient or attenuation coefficient) of the damper of each of the wheels WH on the basis of the predetermined acceleration acquired by the predetermined acceleration detection sensor 106 (sprung acceleration of each of the wheels WH, unsprung acceleration of each of the wheels WH, lateral acceleration of the autonomous traveling vehicle 100, and front-back acceleration of the autonomous traveling vehicle 100), and the vibration suppression control unit 1034 controls the damper actuator 107 of each of the wheels WH in accordance with the calculated damping force characteristic (damping coefficient or attenuation coefficient). Accordingly, the vibration of the autonomous traveling vehicle 100 (vibration of the body) is attenuated. The "predetermined threshold value" referred to herein is the value which is set while being correlated with the sprung acceleration, the unsprung acceleration, the lateral acceleration, and the front-back acceleration respectively. The "predetermined threshold value" is the value which is changed depending on the target acceleration corresponding to each of the accelerations. For example, the predetermined threshold value of each of the accelerations is set to a small value when the target acceleration corresponding to each of the accelerations is small as compared with when the target acceleration corresponding to each of the accelerations is large. Note that as for the method for calculating the damping force characteristic (damping coefficient or attenuation coefficient) of the damper, it is possible to adopt any known method. Further, the predetermined acceleration is not limited to one which includes all of the sprung acceleration, the unsprung acceleration, the lateral acceleration, and the front-back acceleration. It is enough that the predetermined acceleration includes at least one of them. In accordance therewith, as for the target acceleration and the predetermined threshold value described above, it is also appropriate to set those corresponding to the acceleration component included in the predetermined acceleration.

The traveling data generating unit 1035 generates the traveling data including the magnitude of the predetermined acceleration actually generated when the autonomous traveling vehicle 100 travels on each of the sections of the road and the target acceleration set when the subject vehicle travels on each of the sections of the road. The traveling data as described above is generated for every section on which the autonomous traveling vehicle 100 actually travels. Note that as for the magnitude of the predetermined acceleration included in the traveling data, it is allowable to use the maximum value (peak value) of the predetermined acceleration actually generated during the traveling on each of the sections, or it is allowable to use the average value of the predetermined acceleration generated during the traveling on each of the sections. Further, the target acceleration, which is included in the traveling data, is the target acceleration which is set for every section by the server apparatus 200. The traveling data, which is generated by the traveling data generating unit 1035, is transmitted to the server apparatus 200 together with the section identification information for identifying the section on which the autonomous traveling vehicle 100 actually travels.

The driving unit 104 is the means for allowing the autonomous traveling vehicle 100 to travel on the basis of the command generated by the traveling control unit 1033. The driving unit 104 is configured to include, for example, a motor (for example, an internal combustion engine, an electric motor, or a hybrid mechanism of an internal combustion engine and an electric motor), a braking apparatus, and a steering arrangement (steering gear).

The communication unit 105 is the communication means for connecting the autonomous traveling vehicle 100 to the network. In this embodiment, the communication can be performed with any other apparatus (for example, the server apparatus 200) via the network by utilizing the mobile communication service such as 3G (3rd Generation), LTE (Long Term Evolution) or the like. Note that the communication unit 105 may further comprise any communication means for performing the inter-vehicle communication with respect to any other autonomous traveling vehicle 100. In this embodiment, for example, the communication unit 105 transmits, to the server apparatus 200, the present position information of the subject vehicle acquired by the position information acquiring unit 102, the operation plan (scheduled traveling route) generated by the operation plan generating unit 1031, and the traveling data generated by the traveling data generating unit 1035.

Next, the server apparatus 200 will be explained. The server apparatus 200 is the apparatus which manages the traveling positions of the plurality of autonomous traveling vehicles 100 and which transmits the operation commands to the autonomous traveling vehicles 100. Further, the server apparatus 200 also has a function to accumulate the traveling data generated by each of the autonomous traveling vehicles 100 while being correlated with the section identification information and a function to set the target acceleration adequate for each of the autonomous traveling vehicles 100 to travel on each of the sections on the basis of the accumulated traveling data group. The server apparatus 200 as described above is configured to have a communication unit 201, a control unit 202, and a storage unit 203. The communication unit 201 is a communication interface for performing the communication with the autonomous traveling vehicle 100 via the network in the same manner as the communication unit 105 of the autonomous traveling vehicle 100.

The control unit 202 is the means for controlling the server apparatus 200. The control unit 202 is configured, for example, by CPU. The control unit 202 of this embodiment has, as functional modules, a position information managing unit 2021, an operation command generating unit 2022, a traveling data acquiring unit 2023, a scheduled traveling section acquiring unit 2024, and a target acceleration setting unit 2025. These functional modules may be realized by executing programs stored in the storage means such as ROM or the like by CPU (any of them is not indicated).

The position information managing unit 2021 manages the present positions of the autonomous traveling vehicles 100 under the management of the server apparatus 200. Specifically, the position information managing unit 2021 receives the position information from the plurality of autonomous traveling vehicles 100 under the management of the server apparatus 200 at every predetermined cycle, and the position information managing unit 2021 stores the present positions included in the position information in the storage unit 203 as described later on while being correlated with the date and time.

The operation command generating unit 2022 determines the autonomous traveling vehicle 100 to be dispatched when a vehicle allocation request for the autonomous traveling vehicle 100 is received from the outside, and the operation command generating unit 2022 generates the operation command corresponding to the vehicle allocation request. The vehicle allocation request includes, for example, the followings. However, it is also allowable to provide any other request.

(1) Transport Request for Cargoes and Passengers

This request is to perform the transport of cargoes and passengers by designating the departure point and the destination point, or the traveling route.

(2) Dispatch Request for Autonomous Traveling Vehicle Having Specified Function in Combination This request is to ask the dispatch of the autonomous traveling vehicle 100 having the function of, for example, the lodging facilities for passengers (hotel) or the workspace for passengers (for example, private office or business office). As for the dispatch destination, either a single point is available, or a plurality of points are available. If a plurality of dispatch destinations are designated, it is also allowable to provide the service at the plurality of points respectively.

The vehicle allocation request as described above is acquired from the user or customer, for example, via the internet. Note that it is not necessarily indispensable that the transmission source of the vehicle allocation request should be any general user. The transmission source of the vehicle allocation request may be, for example, an entrepreneur who operates the autonomous traveling vehicle 100. The autonomous traveling vehicle 100, which is the transmission destination of the operation command, is determined depending on, for example, the present position information of each of the autonomous traveling vehicles 100 acquired by the position information managing unit 2021 and the specification of each of the autonomous traveling vehicles 100 (for what way of use the vehicle has its interior/exterior equipment) previously grasped by the server apparatus 200. If the autonomous traveling vehicle 100, which is the transmission destination of the operation command, is determined, the operation command which is generated by the operation command generating unit 2022 and the target acceleration which is set by the target acceleration setting unit 2025 described later on are transmitted to the autonomous traveling vehicle 100 by the aid of communication unit 201.

The traveling data acquiring unit 2023 acquires the traveling data transmitted from each of the autonomous traveling vehicles 100 by the aid of the communication unit 201. The traveling data, which is acquired by the traveling data acquiring unit 2023, is accumulated in the storage unit 203 described later on while being correlated with the section identification information for identifying each of the sections of the road.

The scheduled traveling section acquiring unit 2024 acquires the information in relation to the scheduled traveling section of each of the autonomous traveling vehicles 100. In particular, the scheduled traveling section acquiring unit 2024 firstly acquires the scheduled traveling route of the autonomous traveling vehicle 100 generated by the operation command generating unit 2022 of the server apparatus 200 or the operation plan generating unit 1031 of the autonomous traveling vehicle 100. In the next place, the scheduled traveling section acquiring unit 2024 acquires the section identification information of all of the sections included in the scheduled traveling route described above.

The target acceleration setting unit 2025 sets the target acceleration which is adequate for the traveling on the scheduled traveling section acquired by the scheduled traveling section acquiring unit 2024. In particular, the target acceleration setting unit 2025 extracts the traveling data which is stored while being correlated with the section identification information of the scheduled traveling section, from the traveling data group which is stored in the storage unit 203 described later on. Then, the target acceleration setting unit 2025 sets the target acceleration which is adequate for the autonomous traveling vehicle 100 to travel on the scheduled traveling section, on the basis of the traveling data extracted from the traveling data group described above. In this procedure, if a plurality of pieces of the traveling data are accumulated while being correlated with the section identification information, then the target acceleration setting unit 2025 may extract, for example, the traveling data which is accumulated while corresponding to the specifications most approximate to the specifications of the subject vehicle (for example, the size or dimension, the weight, the wheel base, and the tread), or the target acceleration setting unit 2025 may extract the traveling data in which the magnitude of the predetermined acceleration included in the traveling data is the smallest. If the predetermined acceleration, which is included in the traveling data extracted as described above, has the magnitude which is larger than a predetermined upper limit value that is previously set, the target acceleration setting unit 2025 sets a new target acceleration with which the predetermined acceleration is suppressed to be smaller, as compared with the target acceleration which is included in the traveling data described above. On the other hand, if the predetermined acceleration, which is included in the traveling data extracted as described above, is not more than the predetermined upper limit value described above, the target acceleration setting unit 2025 sets the target acceleration included in the traveling data described above as a new target acceleration as it is. The target acceleration, which is set by the target acceleration setting unit 2025, is transmitted by the communication unit 201 to the autonomous traveling vehicle 100 scheduled to travel on the scheduled traveling section. Accordingly, it is unnecessary for the autonomous traveling vehicle 100 scheduled to travel on the scheduled traveling section to perform the setting process for setting the target acceleration. Further, the target acceleration can be also provided for a plurality of autonomous traveling vehicles 100 scheduled to travel on the scheduled traveling section. As a result, it is possible to realize the preferred vibration control performance in the plurality of autonomous traveling vehicles 100 without excessively increasing the calculation load exerted on the individual autonomous traveling vehicle 100.

The storage unit 203 is the means for storing the information. The storage unit 203 is configured by a storage medium such as a magnetic disk, a flash memory or the like. The vehicle information concerning the individual autonomous traveling vehicle 100 is stored in the storage unit 203 of this embodiment in which the vehicle information is linked to the identification information of the individual autonomous traveling vehicle 100. An explanation will now be made on the basis of FIG. 3 about exemplary configuration of the vehicle information stored in the storage unit 203. FIG. 3 indicates the table configuration of the vehicle information. The vehicle information table indicated in FIG. 3 has respective fields of, for example, the vehicle ID, the position information, the date and time of the receiving, and the specifications of the vehicle. The vehicle identification information (vehicle ID), which is provided to identify the individual autonomous traveling vehicle 100, is inputted into the vehicle ID field. The present position information, which is received by the position information managing unit 2021 from the individual autonomous traveling vehicle 100, is inputted into the position information field. The present position information, which is inputted into the position information field, may be, for example, the information which indicates the address of the place at which the autonomous traveling vehicle 100 is positioned, or the information which indicates the coordinates (latitude, longitude) on a map of the place at which the autonomous traveling vehicle 100 is positioned. The date and time, at which the present position information inputted into the position information field described above is received by the position information managing unit 2021, is inputted into the receiving date and time field. Note that it is assumed that the information, which is inputted into the position information field and the receiving date and time field, is updated every time when the position information managing unit 2021 receives the position information from each of the autonomous traveling vehicles 100 (in the predetermined cycle described above). Then, the information, which indicates the specifications of the autonomous traveling vehicle 100 (for example, the size or dimension, the weight, the wheel base, and the tread), is inputted into the specifications of vehicle field. It is assumed that the information, which is inputted into the specifications of vehicle field, is updated every time when the specifications of each of the autonomous traveling vehicles 100 are changed.

Further, the storage unit 203 also stores the traveling data information in which the traveling data as described above and the section identification information are linked. An explanation will now be made on the basis of FIG. 4 about exemplary configuration of the traveling data information stored in the storage unit 203. FIG. 4 indicates the table configuration of the traveling data information. In the traveling data information table indicated in FIG. 4, the traveling data, which is acquired when each of the autonomous traveling vehicles 100 actually travels on each of the sections, is linked to the section ID (section identification information) for identifying the individual section. In the example indicated in FIG. 4, a plurality of pieces of the traveling data are linked to one section ID, for the following reason. That is, the traveling data, which is acquired for each of the autonomous traveling vehicles 100, is added every time when each of the autonomous traveling vehicles 100 actually travels on each of the sections. Further, in the example indicated in FIG. 4, the traveling data is categorized into the respective fields of the predetermined acceleration, the target acceleration, and the specifications of the vehicle. The magnitude of the predetermined acceleration included in the traveling data acquired by the traveling data acquiring unit 2023 (i.e., the peak value or the average value of the predetermined acceleration generated when the autonomous traveling vehicle 100 actually travels on each of the sections) is inputted into the predetermined acceleration field. The target acceleration included in the traveling data acquired by the traveling data acquiring unit 2023 (i.e., the target acceleration set for the autonomous traveling vehicle 100 when the autonomous traveling vehicle 100 actually travels on each of the sections) is inputted into the target acceleration field. The information concerning the specifications of the autonomous traveling vehicle 100 as the transmission source of the traveling data acquired by the traveling data acquiring unit 2023 is inputted into the specifications of vehicle field. Note that the information, which is inputted into the specifications of vehicle field, is derived from the vehicle information table corresponding to the vehicle ID of the autonomous traveling vehicle 100 as the transmission source of the traveling data.

<Operation Action of Autonomous Traveling Vehicle>

An explanation will now be made about the processes performed by the respective constitutive components described above. FIG. 5 explains the data flow provided when the server apparatus 200 generates the operation command on the basis of a vehicle allocation request of a user, and the autonomous traveling vehicle 100 performs the operation in accordance with the generated operation command. In this embodiment, as indicated in FIG. 6, an explanation will be made as exemplified by an exemplary case in which the autonomous traveling vehicle 100 is operated from a departure point P1 to a destination point P2 along a scheduled traveling route including a section A, a section B, and a section C.

As described above, the autonomous traveling vehicle 100 notifies the server apparatus 200 of the present position information at a predetermined cycle. In this procedure, the signal, which is transmitted from the autonomous traveling vehicle 100 to the server apparatus 200, includes the identification information (vehicle ID) of the autonomous traveling vehicle 100 in addition to the present position information of the autonomous traveling vehicle 100. If the present position information and the vehicle ID sent from the autonomous traveling vehicle 100 are received by the communication unit 201 of the server apparatus 200 (Step S10), then the position information managing unit 2021 accesses the vehicle information stored in the storage unit 203, and the information of the receiving data and time field and the position information field of the vehicle information table corresponding to the vehicle ID is updated.

Further, if the user transmits the vehicle allocation request to the server apparatus 200 by the aid of unillustrated communication means, the vehicle allocation request is received by the communication unit 201 of the server apparatus 200 (Step S11). In this case, the vehicle allocation request described above includes the information concerning, for example, the departure point P1, the destination point P2, the date and time of departure, the preferred date and time of arrival at the destination point, and the transit point (place for passenger to see sights and/or collection and delivery place for cargo).

In Step S12, the operation command generating unit 2022 of the server apparatus 200 generates the operation command in accordance with the vehicle allocation request. The operation command designates the departure point P1, the destination point P2, the date and time of departure, the preferred date and time of arrival at the destination point, and the transit point. Note that in the example indicated in FIG. 5, it is assumed that the operation command generated by the operation command generating unit 2022 also includes the information for designating the scheduled traveling route from the departure point P1 to the destination point P2. In other words, in the example indicated in FIG. 5, it is assumed that the scheduled traveling route of each of the autonomous traveling vehicles 100 is generated by the server apparatus 200.

In Step S13, the operation command generating unit 2022 selects the autonomous traveling vehicle 100 adequate for the vehicle allocation request. For example, the operation command generating unit 2022 firstly makes reference to the vehicle information table of the storage unit 203 to extract all of the autonomous traveling vehicles 100 which can be operated in the period ranging from the date and time of departure to the preferred date and time of arrival. Subsequently, the operation command generating unit 2022 selects one autonomous traveling vehicle 100 which can be moved to the departure point P1 on the date and time of departure on the basis of the respective pieces of position information of the extracted autonomous traveling vehicles 100. When the autonomous traveling vehicle 100, which follows the vehicle allocation request described above, is selected by the operation command generating unit 2022, the information concerning the specifications of the vehicle of the selected autonomous traveling vehicle 100 and the information concerning the scheduled traveling route are delivered from the operation command generating unit 2022 to the scheduled traveling section acquiring unit 2024.

In Step S14, the scheduled traveling section acquiring unit 2024 acquires the section ID's of all of the scheduled traveling sections (section A, section B, and section C indicated in FIG. 6) included in the scheduled traveling route accepted from the operation command generating unit 2022. In this procedure, the scheduled traveling section acquiring unit 2024 may extract the section ID's of all of the scheduled traveling sections included in the scheduled traveling route described above by making reference to the map data stored in the storage unit 203 of the server apparatus 200. The section ID of the scheduled traveling section, which is acquired by the scheduled traveling section acquiring unit 2024, is delivered from the scheduled traveling section acquiring unit 2024 to the target acceleration setting unit 2025 together with the information concerning the specifications of the vehicle delivered from the operation command generating unit 2022 to the scheduled traveling section acquiring unit 2024.

In Step S15, the target acceleration setting unit 2025 sets the target accelerations which are adequate for the autonomous traveling vehicle 100 to travel on the respective sections of the sections A to C, on the basis of the information concerning the section ID's of the scheduled traveling sections and the specifications of the vehicle accepted from the scheduled traveling section acquiring unit 2024. Specifically, the target acceleration setting unit 2025 accesses the traveling data information table accumulated in the storage unit 203, on the basis of the section ID of the scheduled traveling section accepted from the scheduled traveling section acquiring unit 2024. Then, the target acceleration setting unit 2025 extracts the traveling data corresponding to the specifications of the vehicle which are most approximate to the specifications of the vehicle accepted from the scheduled traveling section acquiring unit 2024, from a plurality of pieces of the traveling data linked to the section ID of the scheduled traveling section in the traveling data information table of the storage unit 203. If the magnitude of the predetermined acceleration included in the traveling data extracted as described above is not more than the predetermined upper limit value described above, the target acceleration setting unit 2025 sets the target acceleration adequate to travel on the scheduled traveling section to be the same value as that of the target acceleration included in the traveling data. On the other hand, if the magnitude of the predetermined acceleration included in the traveling data extracted from the traveling data information table is larger than the predetermined upper limit value described above, the target acceleration setting unit 2025 sets the target acceleration adequate to travel on the scheduled traveling section to be the value at which the predetermined acceleration is suppressed to be small as compared with the target acceleration included in the traveling data. The setting process for setting the target acceleration as described above is performed for all of the scheduled traveling sections A to C included in the scheduled traveling route. Accordingly, in this embodiment, the three target accelerations, i.e., the target acceleration TrgA adequate for the section A, the target acceleration TrgB adequate for the section B, and the target acceleration TrgC adequate for the section C are set.

In Step S16, the operation command generated by the operation command generating unit 2022 and the target acceleration set by the target acceleration setting unit 2025 are transmitted to the autonomous traveling vehicle 100 selected by the operation command generating unit 2022 by the aid of the communication unit 201. In this embodiment, the scheduled traveling route of the autonomous traveling vehicle 100 includes the three scheduled traveling sections of the sections A to C. Therefore, the three target accelerations, i.e., the target acceleration TrgA adequate for the section A, the target acceleration TrgB adequate for the section B, and the target acceleration TrgC adequate for the section C are transmitted together with the operation command from the server apparatus 200 to the autonomous traveling vehicle 100.

If the operation command and the target acceleration transmitted from the server apparatus 200 are received by the communication unit 105 of the autonomous traveling vehicle 100, the operation plan generating unit 1031 of the autonomous traveling vehicle 100 generates the operation plan on the basis of the operation command received from the server apparatus 200 (Step S17). The operation plan, which is generated by the operation plan generating unit 1031, is delivered from the operation plan generating unit 1031 to the traveling control unit 1033. Then, the traveling control unit 1033 starts the operation of the autonomous traveling vehicle 100 in accordance with the operation plan accepted from the operation plan generating unit 1031 (Step S18).

When the operation of the autonomous traveling vehicle 100 is started by the traveling control unit 1033, the vibration suppression control unit 1034 controls the damper actuator 107 of each of the wheels WH so that the predetermined acceleration of the subject vehicle approaches the target acceleration which is adequate for the traveling section of the subject vehicle (Step S19). For example, when the autonomous traveling vehicle 100 travels on the section A, the vibration suppression control unit 1034 controls the damper actuator 107 of each of the wheels WH so that the predetermined acceleration of the subject vehicle approaches the target acceleration TrgA which is adequate for the section A. After that, when the traveling section of the subject vehicle changes over from the section A to the section B, the vibration suppression control unit 1034 controls the damper actuator 107 of each of the wheels WH so that the predetermined acceleration of the subject vehicle approaches the target acceleration TrgB which is adequate for the section B. Further, when the traveling section of the subject vehicle changes over from the section B to the section C, the vibration suppression control unit 1034 controls the damper actuator 107 of each of the wheels WH so that the predetermined acceleration of the subject vehicle approaches the target acceleration TrgC which is adequate for the section C. Note that it is specified on what section of the three scheduled traveling sections A to C the autonomous traveling vehicle 100 travels, on the basis of the present position information of the autonomous traveling vehicle 100 acquired by the position information acquiring unit 102. Further, when the damper actuator 107 of each of the wheels WH is controlled by the vibration suppression control unit 1034, the predetermined threshold value described above is firstly determined on the basis of the target acceleration. Subsequently, if at least one of the sprung accelerations of the plurality of wheels WH, at least one of the unsprung accelerations of the plurality of wheels WH, the lateral acceleration of the autonomous traveling vehicle 100, or the front-back acceleration of the autonomous traveling vehicle 100 exceeds the predetermined threshold value described above, then the vibration suppression control unit 1034 individually calculates the damping force characteristic (damping coefficient or attenuation coefficient) of the damper of each of the wheels WH on the basis of the predetermined acceleration (for example, the sprung acceleration of each of the wheels WH, the unsprung acceleration of each of the wheels WH, the lateral acceleration of the autonomous traveling vehicle 100, or the front-back acceleration of the autonomous traveling vehicle 100) acquired by the predetermined acceleration detection sensor 106, and the vibration suppression control unit 1034 controls the damper actuator 107 of each of the wheels WH in accordance with the calculated damping force characteristic (damping coefficient or attenuation coefficient). Accordingly, when the autonomous traveling vehicle 100 actually travels on the scheduled traveling section, the vibration attenuating process is performed on the basis of the target acceleration which is adequate for the traveling on the scheduled traveling section. As a result, it is possible to realize the vibration control performance adequate for the section on which the autonomous traveling vehicle 100 travels.

In Step S20, the traveling data, which includes the target acceleration and the magnitude of the predetermined acceleration generated when the autonomous traveling vehicle 100 actually travels on the scheduled traveling section, is generated by the traveling data generating unit 1035. The generating process for generating the traveling data is performed for every section included in the scheduled traveling route. In this embodiment, pieces of the traveling data, which correspond to the three sections of the sections A to C respectively, are generated. In particular, the traveling data including the target acceleration TrgA of the section A and the magnitude of the predetermined acceleration (peak value or average value) generated when the autonomous traveling vehicle 100 actually travels on the section A, the traveling data including the target acceleration TrgB of the section B and the magnitude of the predetermined acceleration (peak value or average value) generated when the autonomous traveling vehicle 100 actually travels on the section B, and the traveling data including the target acceleration TrgC of the section C and the magnitude of the predetermined acceleration (peak value or average value) generated when the autonomous traveling vehicle 100 actually travels on the section C are generated. The three pieces of the traveling data generated as described above are transmitted from the communication unit 105 of the autonomous traveling vehicle 100 to the server apparatus 200 together with the section ID's of the sections corresponding to the individual pieces of the traveling data (Step S21).

The traveling data and the section ID, which are transmitted from the autonomous traveling vehicle 100 to the server apparatus 200, are acquired by the traveling data acquiring unit 2023 of the server apparatus 200. The traveling data, which is acquired by the traveling data acquiring unit 2023, is added to the traveling data information table of the storage unit 203 together with the vehicle specifications of the autonomous traveling vehicle 100. In this embodiment, the pieces of information concerning the predetermined acceleration generated when the autonomous traveling vehicle 100 actually travels on the section A, the target acceleration TrgA set for the traveling, and the vehicle specifications of the autonomous traveling vehicle 100 are added to the traveling data information table linked to the section ID of the section A. Further, the predetermined acceleration generated when the autonomous traveling vehicle 100 actually travels on the section B, the target acceleration TrgB set for the traveling, and the vehicle specifications of the autonomous traveling vehicle 100 are added to the traveling data information table linked to the section ID of the section B. Furthermore, the predetermined acceleration generated when the autonomous traveling vehicle 100 actually travels on the section C, the target acceleration TrgC set for the traveling, and the vehicle specifications of the autonomous traveling vehicle 100 are added to the traveling data information table linked to the section ID of the section C.

According to the embodiment described above, the traveling data, which includes the target acceleration and the magnitude of the predetermined acceleration actually generated in the autonomous traveling vehicle 100, is accumulated every time when the autonomous traveling vehicle 100 travels on each of the sections of the previously divided road. Thus, it is possible to generate the big data composed of the traveling data groups of a large number of exemplary cases. Then, as for the autonomous traveling vehicle 100 scheduled to travel on each of the sections next time, the target acceleration, which is set on the basis of the traveling data group, is provided from the server apparatus 200 to the autonomous traveling vehicle 100. Thus, it is unnecessary to set, on the vehicle side, the target acceleration which is adequate to travel on each of the sections. Accordingly, it is possible to realize the vibration control performance which is adequate to travel on each of the sections, without excessively increasing the calculation load exerted on the vehicle side. Further, the target acceleration, which is set by the server apparatus 200, can be reflected to not only one autonomous traveling vehicle 100 but also a plurality of autonomous traveling vehicles 100. Accordingly, even in the case of a situation in which, for example, the road surface shape of the road changes on every section, it is possible to realize the preferred vibration control performance for the plurality of autonomous traveling vehicles 100, without excessively increasing the calculation load exerted on the side of the vehicle.

Another Embodiment

Note that the target acceleration, which is required for the autonomous traveling vehicle 100, sometimes changes depending on not only the road surface shape of the road on which the autonomous traveling vehicle 100 travels but also the traveling environment such as the weather, the traffic status and the like. For example, the coefficient of friction of the road surface easily decreases upon the rainfall, the snowfall or the like, as compared with upon the fine weather, the cloudy weather or the like. Therefore, it is desirable that the target acceleration is set while regarding the steering stability as important as compared with the vibration control performance. On the other hand, when the traffic status is bad upon the traffic congestion (traffic jam) or the like, the traveling speed of the autonomous traveling vehicle 100 is lowered, as compared with when the traffic status is good upon the smooth traffic flow or the like. Therefore, it is desirable that the target acceleration is set while regarding the vibration control performance as important as compared with the steering stability.

In view of the above, the traveling data acquiring unit 2023 of the server apparatus 200 may acquire the traveling environment information including the weather information and/or the traffic status provided when each of the autonomous traveling vehicles 100 travels on each of the sections, in addition to the traveling data described above, every time when each of the autonomous traveling vehicles 100 travels on each of the sections of the road. The weather information, which is provided when each of the autonomous traveling vehicles 100 travels on each of the sections, can be acquired from any external service for providing the weather information. Further, if any camera, which can take a photograph (picture) of the image outside the vehicle, is carried on each of the autonomous traveling vehicles 100, it is also possible to acquire the weather information from the image taken by the camera. In the next place, the traffic status, which is provided when each of the autonomous traveling vehicles 100 travels on each of the sections, can be acquired from any external service for providing the traffic status. Further, if any camera, which can take a photograph (picture) of the image outside the vehicle, is carried on each of the autono-mous traveling vehicles 100, it is also possible to acquire the traffic status from the image taken by the camera.

The traveling data and the traveling environment information, which are acquired by the traveling data acquiring unit 2023, are stored in the traveling data information table of the storage unit 203. In this context, FIG. 7 exemplifies the table configuration of the traveling data information table in another embodiment. In the traveling data information table indicated in FIG. 7, the traveling environment, which is provided when each of the autonomous traveling vehicles 100 actually travels on each of the sections, is also linked to the section ID (section identification information) for identifying the individual section, in addition to the traveling data acquired when each of the autonomous traveling vehicles 100 actually travels on each of the sections. The traveling data, which is registered in the traveling data information table, is categorized into the respective fields of the predetermined acceleration, the target acceleration, and the specifications of the vehicle. Then, the weather information and/or the traffic status, which is/are provided when each of the autonomous traveling vehicles 100 actually travels on each of the sections, is/are inputted into the traveling environment field.

When the traveling data information table is configured as indicated in FIG. 7, if the traveling data, which is adequate to set the target acceleration, is extracted from the traveling data group accumulated in the storage unit 203, then the target acceleration setting unit 2025 firstly extracts the traveling data accumulated while corresponding to the specifications most approximate to the specifications of the subject vehicle, of the traveling data linked to the section identification information (section ID) of the scheduled traveling section. Subsequently, the target acceleration setting unit 2025 extracts the traveling data accumulated while corresponding to the traveling environment most approximate to the traveling environment provided when the autonomous traveling vehicle 100 travels on the scheduled traveling section, from the traveling data extracted as described above. Note that the target acceleration setting unit 2025 may firstly extract the traveling data accumulated while corresponding to the traveling environment most approximate to the traveling environment provided when the autonomous traveling vehicle 100 travels on the scheduled traveling section, from the traveling data linked to the section identification information (section ID) of the scheduled traveling section. The traveling data, which is accumulated while corresponding to the specifications most approximate to the specifications of the autonomous traveling vehicle 100, may be extracted from the traveling data extracted as described above.

If the target acceleration, which is adequate for the traveling on each of the scheduled traveling sections, is set on the basis of the traveling data extracted by the method as described above, it is possible to set the target acceleration which is also adequate for the traveling environment of each of the sections in addition to the road surface shape of each of the sections. Accordingly, the vibration control performance, which is provided when each of the autonomous traveling vehicles 100 travels, can be made more adequate for the traveling section of each of the autonomous traveling vehicles 100.

Other Embodiments

Note that in the respective embodiments described above, the autonomous traveling vehicle is exemplified as the vehicle to which the present disclosure is applied by way of example. However, the present disclosure is also applicable to a vehicle which is driven by manual operation by a driver. In this case, when the driver sets the scheduled traveling route from the present point to the destination point by means of a navigation system of the vehicle, the scheduled traveling route may be transmitted from the vehicle to the server apparatus. Then, the server apparatus may set the target acceleration which is adequate for each of the scheduled traveling sections included in the scheduled traveling route, on the basis of the scheduled traveling route received from the vehicle.

Further, in the respective embodiments described above, the example, in which the predetermined acceleration approaches the target acceleration by controlling one parameter (damping force characteristic (damping coefficient or attenuation coefficient) of the damper) of the plurality of parameters that affect the predetermined acceleration of the vehicle, has been described in this embodiment. However, there is no limitation thereto. The present disclosure is also applicable to the configuration in which the predetermined acceleration approaches the target acceleration by controlling at least two parameters of the plurality of parameters that affect the predetermined acceleration of the vehicle.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A server apparatus capable of communicating with a plurality of vehicles each of which carries a vibration control apparatus for attenuating vibration of the vehicle by adjusting a parameter that affects a predetermined acceleration so that the predetermined acceleration, which includes at least one of an acceleration in an upward-downward direction, an acceleration in a lateral direction, and an acceleration in a front-back direction, approaches a target acceleration, the server apparatus comprising:

a controller comprising at least one processor, the controller configured to:

acquire traveling data including a magnitude of the predetermined acceleration generated in each of the vehicles and the target acceleration set for each of the vehicles every time when each of the vehicles, which carries the vibration control apparatus, travels on each of sections of a previously divided road;

accumulate the traveling data while being correlated with section identification information as identification information of the section on which each of the vehicles travels;

acquire a scheduled traveling section of each of the vehicles;

set the target acceleration which is adequate for each of the vehicles to travel on the scheduled traveling section on the basis of the traveling data accumulated while being correlated with the section identification information of the scheduled traveling section; and transmit the target acceleration to each of the vehicles scheduled to travel on the scheduled traveling section.

2. The server apparatus according to claim 1, wherein the controller:

acquires traveling environment information including at least one of weather information and traffic status provided when each of the vehicles travels on each of the sections, in addition to the traveling data including the magnitude of the predetermined acceleration generated in each of the vehicles and the target acceleration set for each of the vehicles, every time when the vehicle, which carries the vibration control apparatus, travels on each of the sections;

accumulates the traveling data and the traveling environment information while being correlated with the section identification information of the section on which each of the vehicles travels; and extracts the traveling data corresponding to a traveling environment approximate to a traveling environment provided when each of the vehicles travels on the scheduled traveling section, from the traveling data accumulated while being correlated with the section identification information of the scheduled traveling section so that the target acceleration, which is adequate for each of the vehicles to travel on the scheduled traveling section, is set on the basis of the extracted traveling data.

3. The server apparatus according to claim 1, wherein:

when the vehicle is provided with an operation control apparatus for allowing a subject vehicle to perform autonomous traveling in accordance with a predetermined operation command;

the controller is further configured to generate the operation command adequate for the vehicle and transmit the generated operation command to the operation control apparatus.

4. The server apparatus according to claim 2, wherein:

when the vehicle is provided with an operation control apparatus for allowing a subject vehicle to perform autonomous traveling in accordance with a predetermined operation command;

the controller is further configured to generate the operation command adequate for the vehicle and transmit the generated operation command to the operation control apparatus.

* * * * *